(12) United States Patent
Lato

(10) Patent No.: US 8,210,128 B1
(45) Date of Patent: Jul. 3, 2012

(54) COUNTERWEIGHTED CROWD GATE FOR MILKING PARLOR

(76) Inventor: Roy Lato, Thorp, WI (US)

( * ) Notice: Subject to any disclaimer, the term of this patent is extended or adjusted under 35 U.S.C. 154(b) by 91 days.

(21) Appl. No.: 12/807,800

(22) Filed: Sep. 12, 2010

Related U.S. Application Data

(60) Provisional application No. 61/277,693, filed on Sep. 28, 2009.

(51) Int. Cl.
*A01K 15/04* (2006.01)

(52) U.S. Cl. .............. 119/510; 119/14.03; 119/840

(58) Field of Classification Search ............ 119/14.03, 119/510, 524, 840, 843, 846, 845; *A01K 15/04, A01K 15/00, 15/02*
See application file for complete search history.

(56) References Cited

U.S. PATENT DOCUMENTS

| | | | |
|---|---|---|---|
| 2,691,359 A | 10/1954 | Anstiss et al. | |
| 3,799,115 A | 3/1974 | Fullerton et al. | |
| 3,805,741 A | 4/1974 | Thompson et al. | |
| 3,908,599 A | 9/1975 | Flocchini | |
| 3,921,586 A | 11/1975 | Sweeney et al. | |
| 4,006,714 A | 2/1977 | Goossen | |
| 4,445,460 A | 5/1984 | Stencil | |
| 5,622,141 A | 4/1997 | Larava | |
| 5,799,615 A | 9/1998 | Hoppman et al. | |
| 6,205,951 B1 | 3/2001 | Sprik | |
| 2005/0161001 A1* | 7/2005 | Kildegaard | 119/510 |

* cited by examiner

*Primary Examiner* — Son T Nguyen
*Assistant Examiner* — Shadi Baniani
(74) *Attorney, Agent, or Firm* — Tipton L. Randall

(57) ABSTRACT

A counterweighted, crowd gate includes parallel overhead tracks extending from end to end of a holding area for cows. A wheeled carriage extends between and rides on the tracks. An electric motor drives the carriage between the entrance and exit of the holding area. A counterweighted gate pivotally attached to the carriage extends perpendicularly to the floor of the holding area. A latch on the carriage holds the gate in essentially a vertical orientation. An operator trips the latch and the counterweight pivots the gate to a substantially horizontal position, so the gate passes over animals in the holding area upon return to the entrance. The gate is pivotally mounted to the carriage by bushings that electrically insulate the gate from the carriage to prevent harm to animals or individuals that come in contact with the gate. A control panel allows operation of the crowd gate from a remote location.

16 Claims, 9 Drawing Sheets

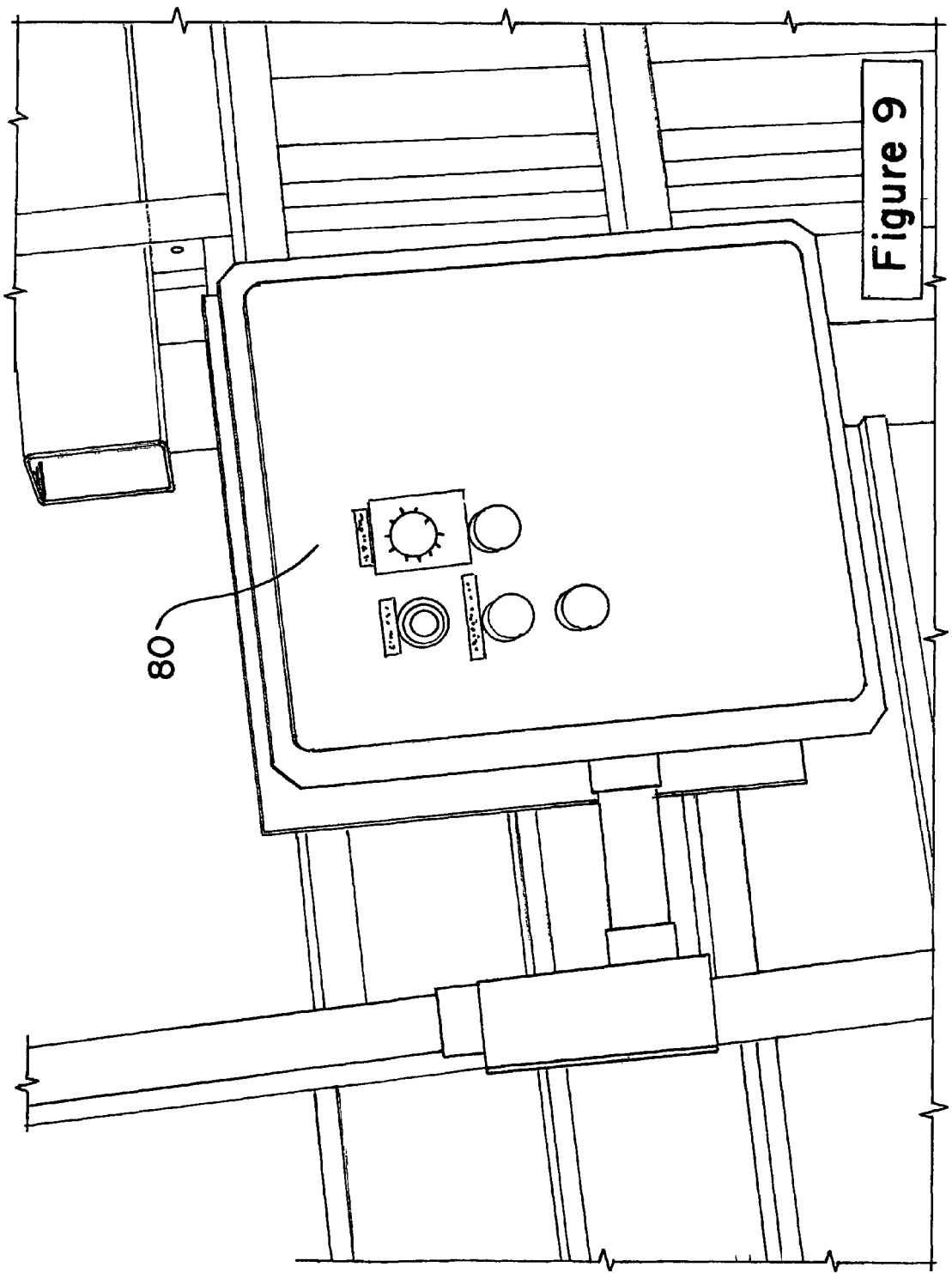

US 8,210,128 B1

COUNTERWEIGHTED CROWD GATE FOR MILKING PARLOR

CROSS-REFERENCE TO RELATED APPLICATIONS, IF ANY

This application claims the benefit under 35 U.S.C. §119 (e) of co-pending provisional application Ser. No. 61/277,693, filed 28 Sep. 2009. Application Ser. No. 61/277,693 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to animal control and, more particularly, to a crowd gate for use in a milking parlor and, most particularly, to a counterweighted, crowd gate suspended from a carriage supported above a holding area adjacent the milking parlor.

2. Background Information

Modern dairy farming operations that involve the handling of relatively large dairy herds must be managed with a minimum of manpower in order to maximize their profitability. A major development in dairy farm operation is the use of milking parlors, which permit one man to handle the milking of several animals at a time. In order to expedite the movement of the animals into and through the milking parlor, a holding area is employed to which several cows are admitted and from which they enter the milking parlor under the control of the operator.

One or two balky cows in the holding area can delay the operation. Consequently, crowd gates have been developed, which move from the entrance end of the holding area to the exit end at the milking parlor. The operator controls the movement of the crowd gate to urge the cattle in the holding area and then into the milking parlor. Patents that show crowd gates in dairy farm operation include the following.

In U.S. Pat. No. 2,691,359, Anstiss et al. disclose a movable fence section for a corral. The movable fence section rests on wheels that contact the ground, and the fence section is moved by cables and pulleys operated by hand. An electrified wire (41) extends from one face of the fence section for prodding the animals as the fence section travels forward to reduce the size of the corral holding the animals.

Fullerton et al., in U.S. Pat. No. 3,799,115, describe a gate for crowding animals toward the exit of a runway that has parallel side walls and a floor. The gate extends downwardly from a frame extending across the runway. A motor on the frame drives flanged wheels, engaging rails mounted on the side walls. Counterweights are on the frame near the wheels for increasing the frictional grip of the wheels on the rails. The gate has a floor scraper that is mounted so as to be movable up and down and swing about a horizontal axis relative to the gate and a curved plate mounted to move with the scraper to swing the scraper away from the floor when it encounters debris on the floor, during movement toward the exit. Limit switches are provided to halt the motor when the gate reaches the end of its desired travel in either direction.

In U.S. Pat. No. 3,805,741, Thompson et al. disclose a crowd gate for urging animals, for example, cows, toward a desired position as, for example, a milking parlor. The crowd gate includes a carriage, which is adapted to ride on an overhead track and which swingably mounts a depending gate which may come into contact with an animal standing on a surface underlying the rails. A motor is operative to drive the carriage and, thus, the gate along the rails until such time as the gate encounters an animal, at which time the motor is de-energized for a predetermined time. After the time has elapsed, the motor is again energized until an animal is again engaged. The system also includes a pair of cables for elevating the gate and for reversing the carriage motors so that the carriage in the gate may be returned to a starting position.

Flocchini, in U.S. Pat. No. 3,908,599, describes an animal corral for the prodding movement of livestock from an animal receiving station to an animal processing station. The pen includes paired, parallel, elongated pen sides, extending between a livestock receiving station at one end and a livestock processing station at the other end. A gate is typically mounted to move between the sides from the livestock receiving station to the livestock processing station. A continuous loop of reeving, running the full length of the corral sides, drives the moveable gate on both sides, where it is adjacent to the paired, elongate corral sides. The loop is powered by a driving mechanism, which includes a specialized transmission. This transmission provides power for the ordinary unobstructed movement of the gate and acts to sense when the gate encounters resistance to forward motion, such as that resistance provided by contacting recalcitrant livestock within the pen. The sensing of the motor is accomplished by a power-sensing means, which connects to appropriate circuitry to interrupt the forward movement of the fence for a preselected interval of time. At the end of this interval of time, forward sweeping movement of the gate recommences. Through sequential stop and start movements of the gate, prodding of the livestock within the pen from the animal receiving station to the animal processing station occurs. The invention relates to livestock corrals for sweeping animals from a receiving station to a processing station.

In U.S. Pat. No. 3,921,586, Sweeney et al. disclose a carriage mounted, horizontally pivoted, crowd gate for a milking parlor holding area in which cattle are admitted through an entry end of the holding area, which is opposite the exit to the milking parlor. An overhead cable, which is connected to the top of the gate for moving the gate from end to end of the holding area, carries a lifting cable, which is secured to the drive cable a short distance from the gate toward the entry end, and which is secured to the bottom of the gate. By blocking the carriage while continuing to operate the drive cable toward the entry end, the lifting cable is pulled to swing the gate up on its pivots, after which a lug on the cable strikes a limit switch to stop the gate drive. Opposite movement of the drive cable slacks the lifting cable so the gate returns to vertical position.

Goossen, in U.S. Pat. No. 4,006,714, describes a training and crowd gate for urging animals to move through a passageway. The training and crowd gate includes an overhead track which extends along the passageway and a carriage movably suspended from the track. A cross arm is mounted on the carriage and a plurality of flexible electrical conductors hang downwardly from spaced points on the cross arm to form a barrier across the passageway. An audible signal, a conductor charger and a carriage drive unit are carried on the carriage. A control at an operator's station, remote from the crowd gate, simultaneously energizes the audible signal means and carriage drive unit and further connects the conductor charger to a source of electrical energy. By repeating the movement of the charged barrier in the presence of an audible signal, the animals are trained to associate the audible signal with the movement of the barrier in a charged state and, subsequently, move through the passageway ahead of the barrier even without a charge on the conductors.

In U.S. Pat. No. 4,445,460, Stencil discloses a crowd gate for use in herding animals from an entry end of a holding area to the exit end of a holding area. A pivoting gate is suspended from the wheeled carriage into the holding area and moves along tracks above the holding area. The suspended gate herds the animals in the area before it. The gate is responsive to animal contact to stop movement of the carriage, with the gate being used in association with gate raising means, operative to raise the gate to a horizontal position for return of the carriage to the entry end of the herding area over the heads of incoming animals. A substantially counterbalanced pivoting, spring biased gate is mounted so that it hangs forward in the direction the animals are to be herded, rather than perpendicular to the floor of the holding area. The first contact of the gate is an edge contact of the gate with the legs of the animals being herded. The resistance to pivoting of the gate acting as a goading means, together with a simple mechanical means for raising and securing the counterbalanced gate in a horizontal position during return of such carriage to the point of beginning. The mechanical means includes gate raising slides mounted on the rear of the gate. Stationary rollers are operative to contact the gate raising slides on rearward travel of the carriage, thereby urging the gate into a horizontal position, where the gate is secured by strikers mounted on the carriage. The gate is then lowered to the goading position at the entrance end of the holding area so a further herding cycle can be effected.

Lareva, in U.S. Pat. No. 5,622,141, describes a crowd gate, suspended pivotally from an overhead carriage driven along a track above a herding area from an entry to an exit by an endless chain slidably coupled to the carriage. The central portion of a lift chain is connected at a bottom end to the bottom of the gate and on its top end to the drive chain. The lift chain is arrested by a hanger as the carriage moves toward the entrance, allowing the drive chain to continue travel, resulting in the lift chain being drawn upwardly to draw the gate upwardly to clear a path. This allows a group of animals at the entrance to then be herded toward the exit as the gate is advanced by the drive chain toward the exit. A lost motion device may be incorporated to permit the gate, upon contacting an animal in the herding area, to pivot rearwardly relative to the carriage to prevent damage to the gate. In one embodiment, the gate is electrified to give a goading shock to animals.

In U.S. Pat. No. 5,799,615, Hoppman et al. disclose a roll-up crowd gate having an electrically charged drum that is rotatable in a carriage. Long cables connected to the drum are also electrically charged. A rope translates the carriage in tracks between upstream and downstream locations. Translation of the carriage in the downstream direction, when the cables are unrolled from the drum, urges a first herd of cows to the downstream location. Carriage stops in the tracks stop carriage translation at the downstream location, but continued operation of the rope when the carriage is against the stop causes the drum to roll up the cables. Reverse operation of the rope translates the carriage above the first herd to the upstream location. A carriage stop at the upstream location stops carriage translation, but continued operation of the rope rotates the drum and unrolls the cables behind a second herd of cows.

Sprik, in U.S. Pat. No. 6,205,951, describes a livestock feeder with a top gate, a bottom gate, and a center gate disposed between the top gate and the bottom gate. The top gate, the bottom gate, and the center gate define a gate system. The bottom gate can swing inward when the feed is eaten. Then after the livestock eat the feed when the gate is swung inward, the gate can be "reset" to the vertical position, and then the gate system can be moved closer to the feed. A device for horizontal movement is present on the gate system whereby the gate system can move in a horizontal direction when movement of the device for horizontal movement is initiated. A device for initiating horizontal movement includes a hand crank. The device is used in a covered environment similar to a pole barn. The size can vary depending on the livestock herd, the property, and the feed. A sloped floor helps prevent waste accumulation where the livestock feed.

Applicant has devised a counterweighted, crowd gate device that overcomes many of the shortcomings of the above-described crowd gate inventions

SUMMARY OF THE INVENTION

The invention is directed to a counterweighted, crowd gate device, suitable for use in a milking parlor. The counterweighted, crowd gate device includes parallel overhead tracks, extending from an entrance end to an exit end of a holding area for the cows. A wheeled carriage assembly extends between the tracks and rides on the tracks. An electric motor is mounted on the wheeled carriage assembly and activated to drive the wheeled carriage assembly from the entrance end to the exit end of the holding area and return. Limit switches on the wheeled carriage assembly control the stop point for the wheeled carriage assembly at each end of the holding area A crowd gate is pivotally attached to the wheeled carriage assembly and extends perpendicularly to the floor of the holding area. A counterweight is mounted on the crowd gate above the level of attachment of the crowd gate to the wheeled carriage assembly. The counterweight is approximately equal to the weight of the part of the crowd gate hanging below the level of attachment. Preferably, the counterweight is a metal cylinder filled with cement. A gate latch between the wheeled carriage assembly and the crowd gate holds the crowd gate in essentially a vertical orientation. An operator trips the gate latch and pivots the crowd gate to a substantially horizontal position, so that the crowd gate may pass over an animal on the floor of the holding area on the return of the wheeled carriage assembly to the entrance end of the holding area. The crowd gate is pivotally mounted to the wheeled carriage assembly by a plurality of bushings that electrically insulate the crowd gate from the wheeled carriage assembly. If the motor mounted on the wheeled carriage assembly shorts out to the wheeled carriage assembly, the insulating bushings prevent harm to any animal or individual that may come in contact with the crowd gate. A control panel allows for operation of the counterweighted, crowd gate device from a remote location.

BRIEF DESCRIPTION OF THE DRAWINGS

FIG. 9 is a perspective view of the control panel of the counterweighted, crowd gate device of the present invention.

DESCRIPTION OF THE EMBODIMENTS

Nomenclature

| | |
|---|---|
| 10 | Counterweighted Crowd Gate Device |
| 15 | Overhead Tracks |
| 17 | Vertical Support Posts |
| 20 | Wheeled Carriage Assembly |
| 30 | H-Shaped Frame of Carriage Assembly |
| 32 | Wheels of Carriage Assembly |
| 32a | Vertical Wheel |
| 32b | Horizontal Wheel |
| 34 | Legs of H-Shaped Frame |
| 36 | Crossbar of H-Shaped Frame |
| 38 | Limit Switch |
| 40 | Electric Motor |
| 42 | Drive Mechanism of Carriage |
| 44 | Drive Shaft Member |
| 46 | Bearing Supports for Drive Shaft Member |
| 48 | Power Cord for Electric Motor |
| 50 | Crowd Gate |
| 55 | Electrically Insulated Bushings |
| 60 | Counterweight |
| 70 | Gate Latch for Crowd Gate |
| 75 | Control Cable for Gate Latch |
| 80 | Control Panel |

CONSTRUCTION

The invention is a counterweighted, crowd gate device, suitable for use in a milking parlor. The counterweighted, crowd gate device includes parallel overhead tracks, extending from an entrance end to an exit end of a holding area for the cows. A wheeled carriage assembly extends between the tracks and rides on the tracks. An electric motor is mounted on the wheeled carriage assembly and activated to drive the wheeled carriage assembly from the entrance end to the exit end of the holding area and return. Limit switches on the wheeled carriage assembly controls the stop point for the wheeled carriage assembly at each end of the holding area. A crowd gate is pivotally attached to the wheeled carriage assembly and extends perpendicularly to the floor of the holding area. A counterweight is mounted on the crowd gate above the level of attachment of the crowd gate to the wheeled carriage assembly. The counterweight is approximately equal to the weight of the part of the crowd gate hanging below the level of attachment. Preferably, the counterweight is a metal cylinder filled with cement. A gate latch between the wheeled carriage assembly and the crowd gate holds the crowd gate in essentially a vertical orientation. An operator trips the gate latch and pivots the crowd gate to a substantially horizontal position, so that the crowd gate may pass over an animal on the floor of the holding area on the return of the wheeled carriage assembly to the entrance end of the holding area. The crowd gate is pivotally mounted to the wheeled carriage assembly by a plurality of bushings that electrically insulate the crowd gate from the wheeled carriage assembly. If the motor mounted on the wheeled carriage assembly shorts out to the wheeled carriage assembly, the insulating bushings prevent harm to any animal or individual that may come in contact with the crowd gate. A control panel allows for operation of the counterweighted, crowd gate device from a remote location.

Figure 1:
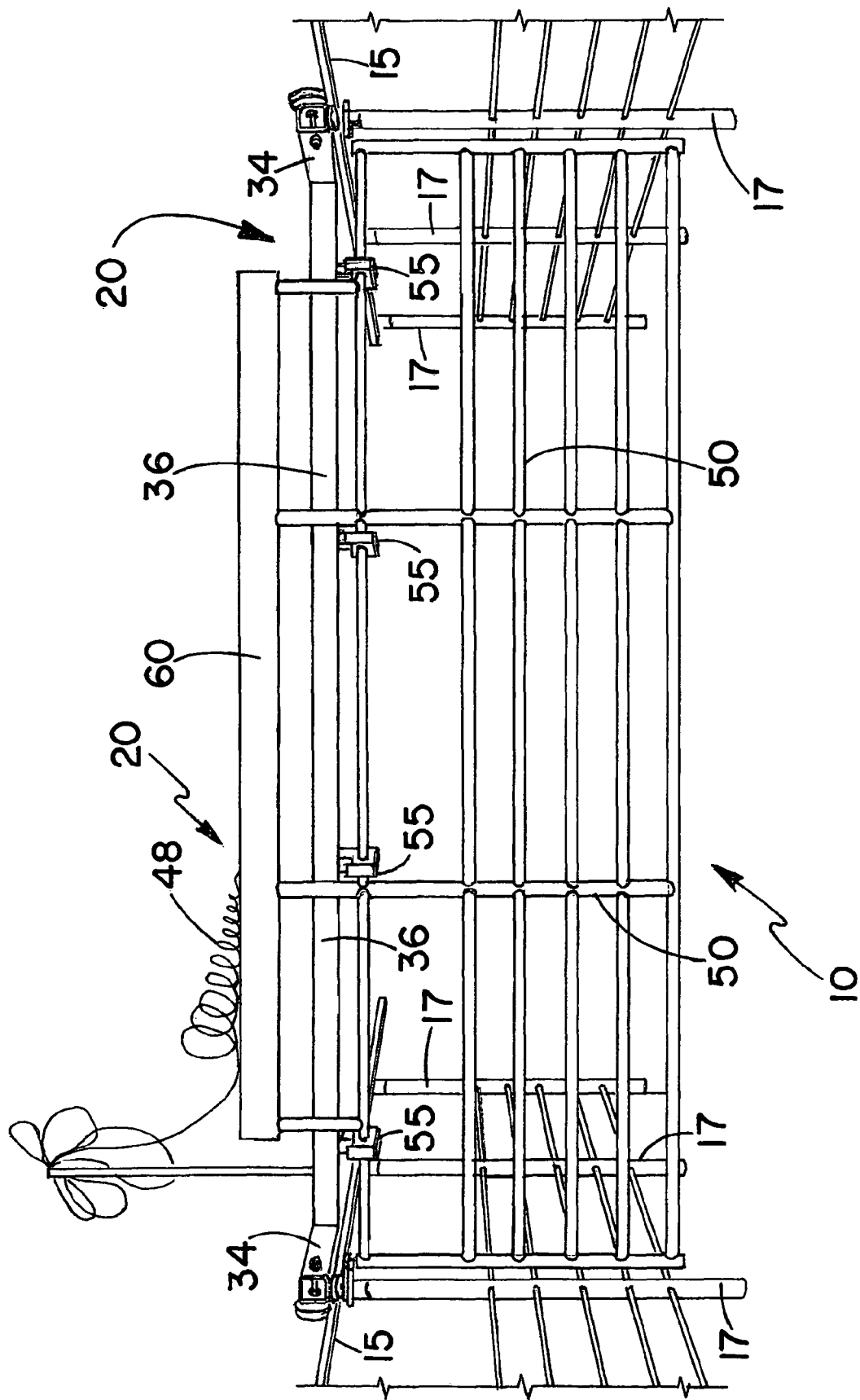
FIG. 1 is a perspective view of the counterweighted, crowd gate device of the present invention in a vertical orientation.

Referring now to FIG. 1, a perspective view of the counterweighted, crowd gate device 10 in a vertical orientation is shown. The counterweighted, crowd gate device includes parallel overhead tracks 15, extending from end to end of a holding area for the cows. The parallel overhead tracks 15 are supported on a plurality of vertical posts 17, extending along each side of the holding area. Other methods for supporting the parallel overhead tracks 15 are contemplated. The overhead tracks 15 are preferably L-shaped angle iron in structure.

Figure 2:
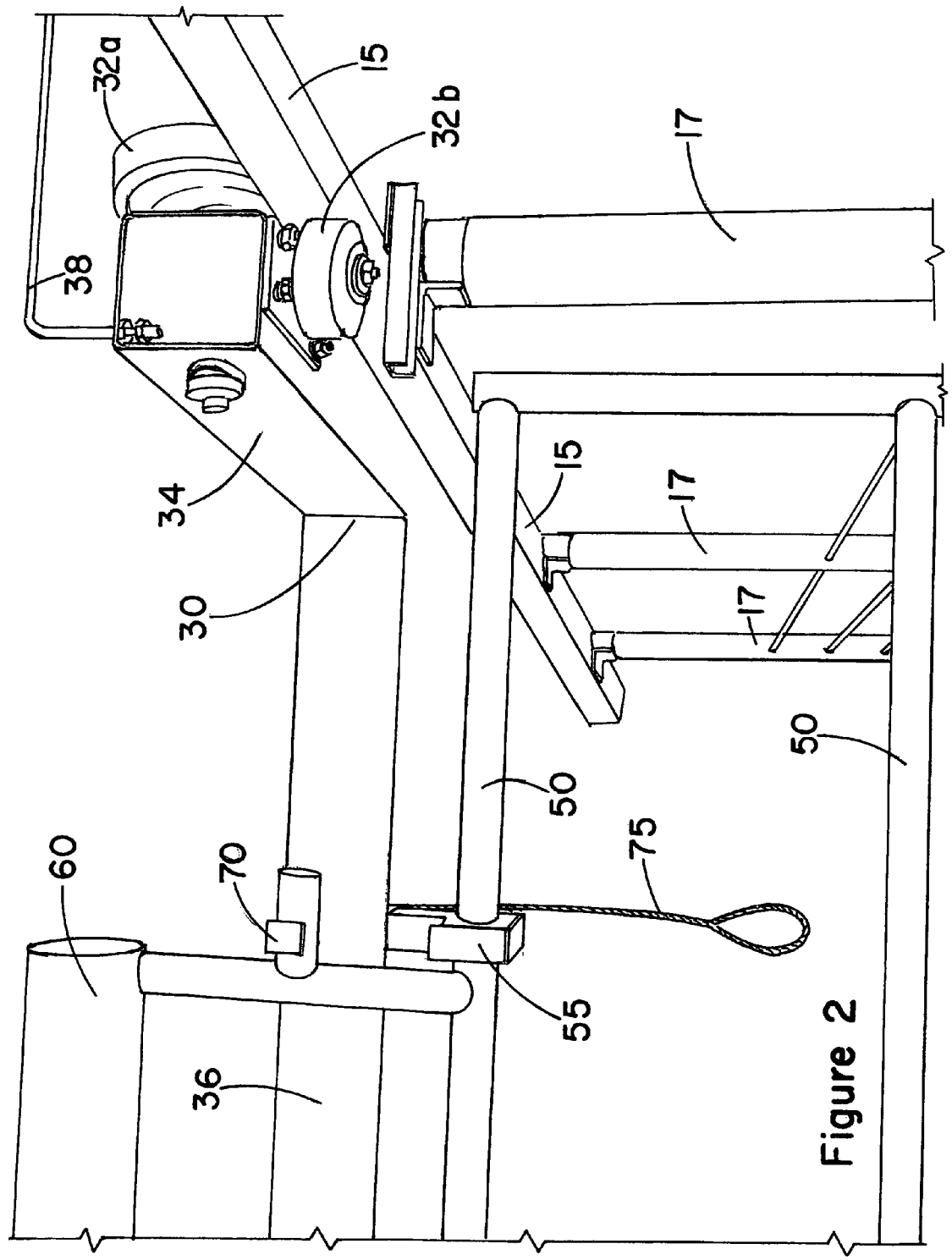
FIG. 2 is a perspective view of a portion of the wheeled carriage assembly of the counterweighted, crowd gate device of the present invention.
Figure 3:
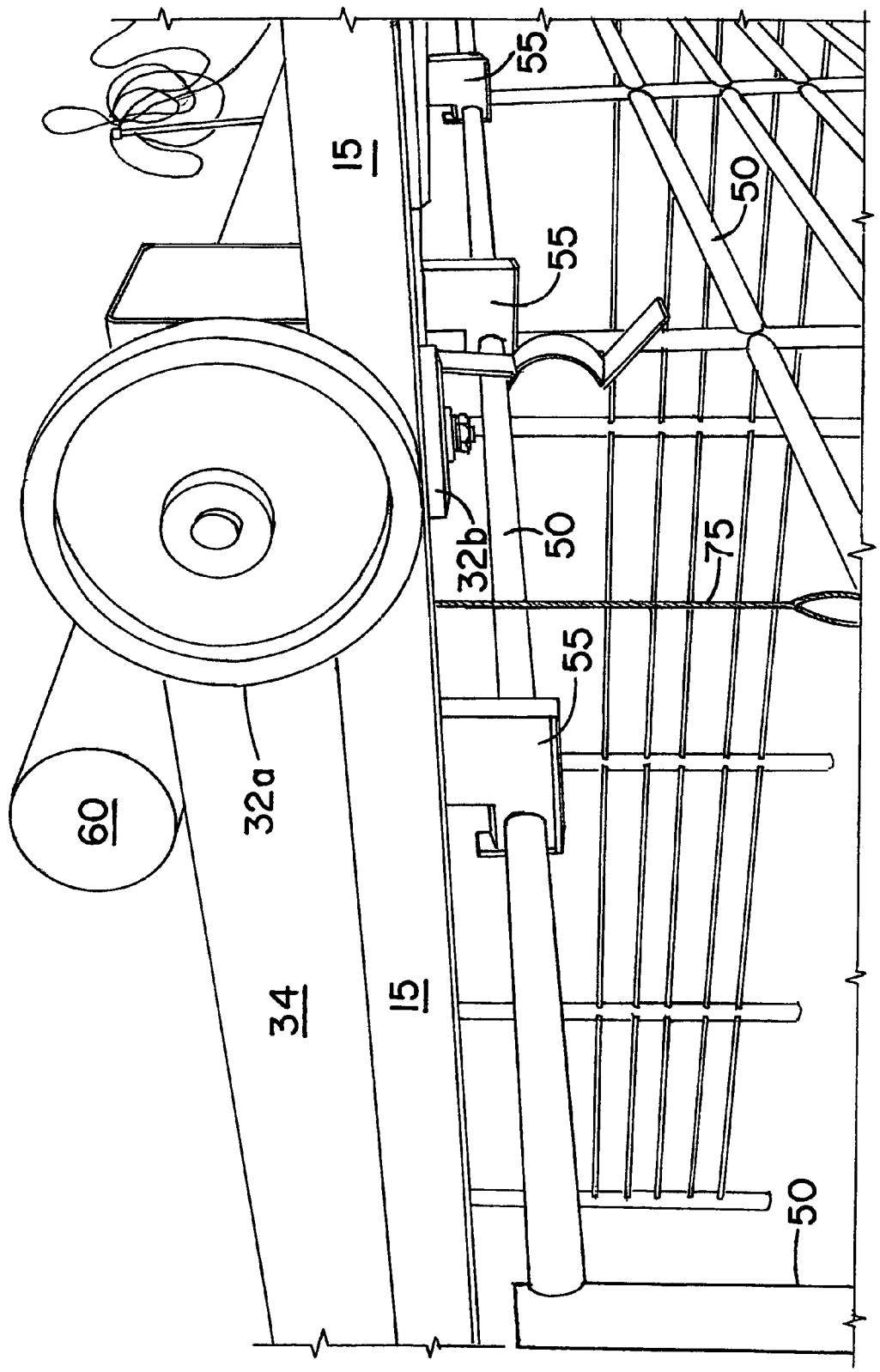
FIG. 3 is another perspective view of a portion of the wheeled carriage assembly of the counterweighted, crowd gate device of the present invention.
Figure 8:
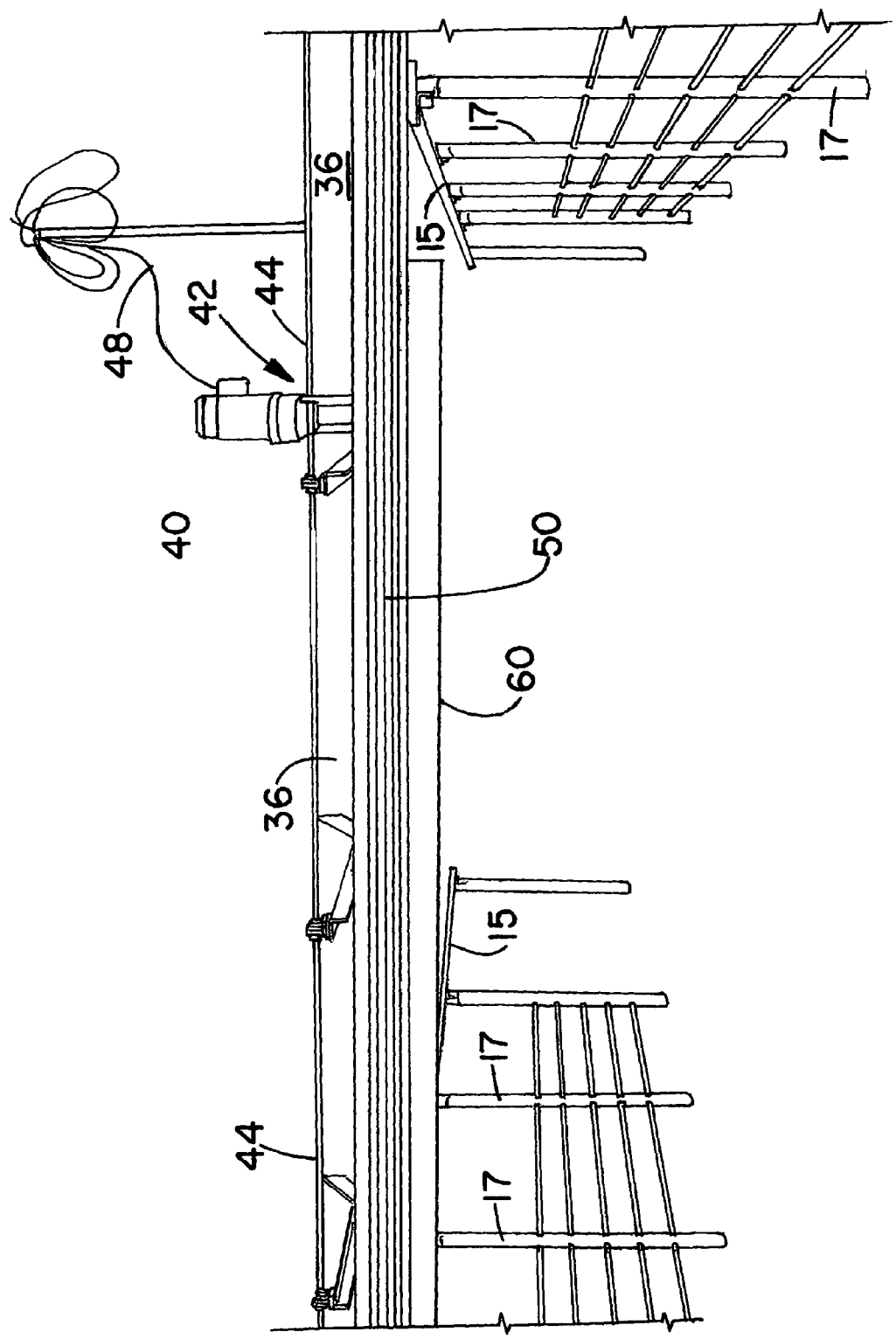
FIG. 8 is a perspective view of the counterweighted, crowd gate device of the present invention in a horizontal orientation traveling toward the entry end of the holding area.

A wheeled carriage assembly 20 extends between the tracks 15 and rides on the tracks 15. The wheeled carriage assembly 20 includes an H-shaped frame member 30 with a pair of wheels 32 at the ends of each of the four legs 34 of the frame member 30. Each pair of wheels 32 includes a larger vertical wheel 32a and a smaller horizontal wheel 32b. The larger wheels 32a contact the overhead angle iron track 15 on the external, flat, horizontal side thereof. The smaller wheels 32b contact the interior, vertical side of the overhead angle iron track 15. The pairs of wheels 32a, 32b provide secure contact between the H-shaped frame member 30 and the parallel overhead tracks 15. The H-shaped frame member 30 and wheels 32a, 32b are best seen in FIGS. 2 and 3. An electric motor 40 is mounted on the wheeled carriage 20 and activated to drive the wheeled carriage 20 from the entrance end to the exit end of the holding area and return. The electric motor 40, which is connected to a drive mechanism 42, is best seen in FIG. 8. The drive mechanism 42 includes a single drive shaft member 44 that is connected to the electric motor 40 and extends across the H-shaped frame member 30 of the wheeled carriage 20. The drive shaft member 44 is supported by multiple bearings 46, mounted on the frame member 30 of the wheeled carriage assembly 20. Each end of the drive shaft member 44 is connected to one of the larger vertical wheels 32a, and rotation of the drive shaft member 44 by the electric motor 40 propels the wheeled carriage assembly 20 along the overhead tracks 15. The electrical power cord 48 to the electric motor 40 is suspended on an overhead support wire to maintain the power cord 48 well above the wheeled carriage assembly 20 as it moves along the overhead tracks 15. Preferably, the electric motor 40 is a reversible, variable speed type. Limit switches 38 on the wheeled carriage assembly 20 control the stop point for the wheeled carriage assembly 20 at each end of the overhead tracks 15 above the holding area.

Figure 4:
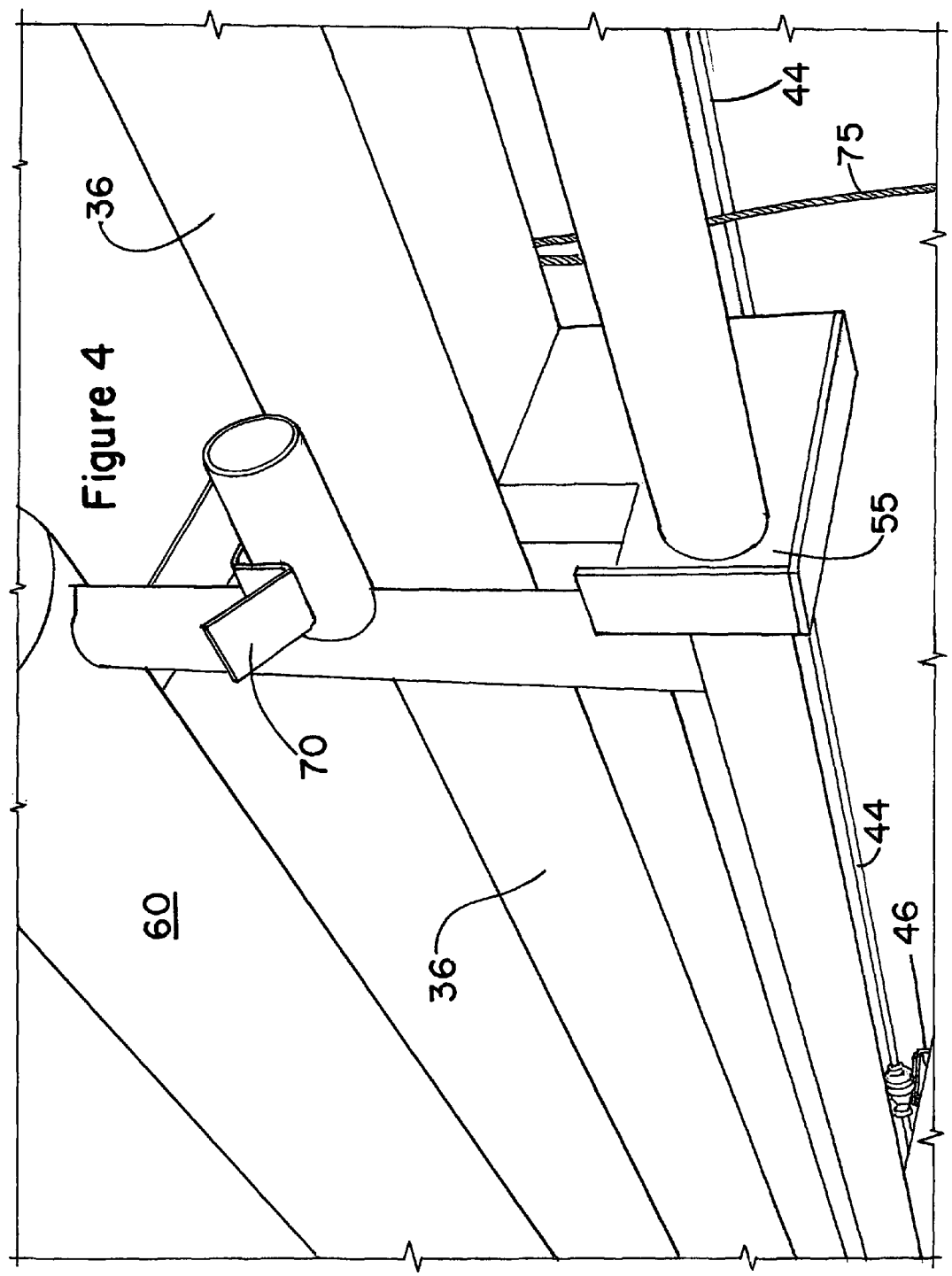
FIG. 4 is a perspective view of the counterweight and gate latch mechanism of the counterweighted, crowd gate device of the present invention.

A crowd gate 50 is pivotally attached to the cross bar portion 36 of the wheeled, carriage frame member 30 and extends perpendicularly to the floor of the holding area. The crowd gate 50 is composed of vertical and horizontal sections of tubing that intersect each other perpendicularly to form a rectangular structure. A counterweight 60 is mounted on the crowd gate 50 above the points of attachment of the crowd gate 50 to the wheeled carriage assembly 20. The counterweight 60 is approximately equal to the weight of the part of the crowd gate 50 hanging below the level of attachment. Preferably, the counterweight 60 is a metal cylinder filled with cement and attached to a majority of the vertical tubing that extends above the wheeled carriage assembly 20. As shown in FIG. 4, a gate latch 70 between the wheeled carriage assembly 20 and the crowd gate 50 holds the gate 50 in essentially a vertical orientation during travel of the wheeled carriage assembly 20 from the entrance end to the exit end of the holding area. The gate latch 70 is manually operated by means of a control cable 75, so the operator can open the gate latch 70 to move the crowd gate 50 from vertical to horizontal, prior to return of the crowd gate device 10 to the entry end of the holding area.

Figure 5:
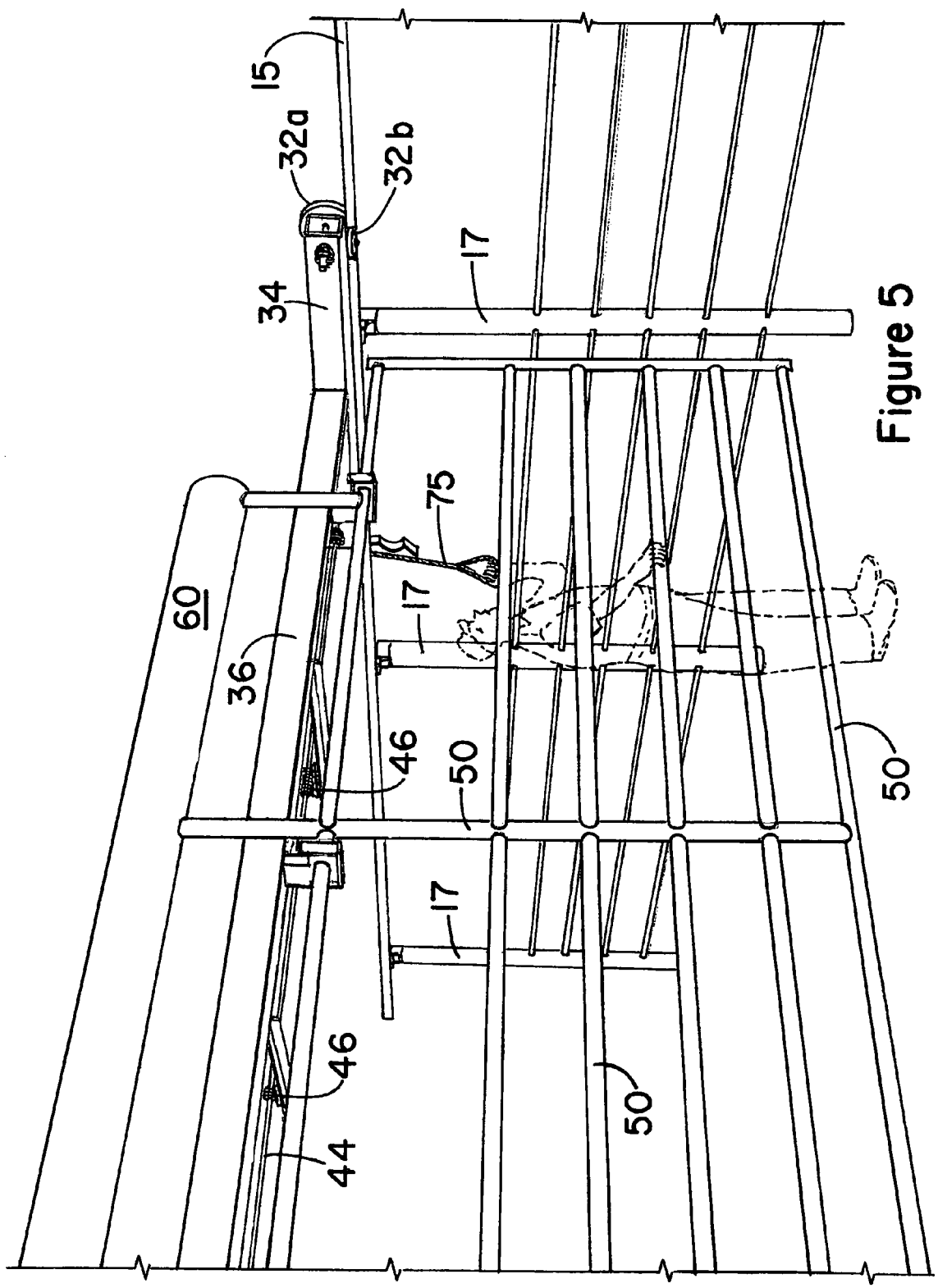
FIG. 5 is another perspective view of the counterweighted, crowd gate device of the present invention in a vertical orientation.
Figure 6:
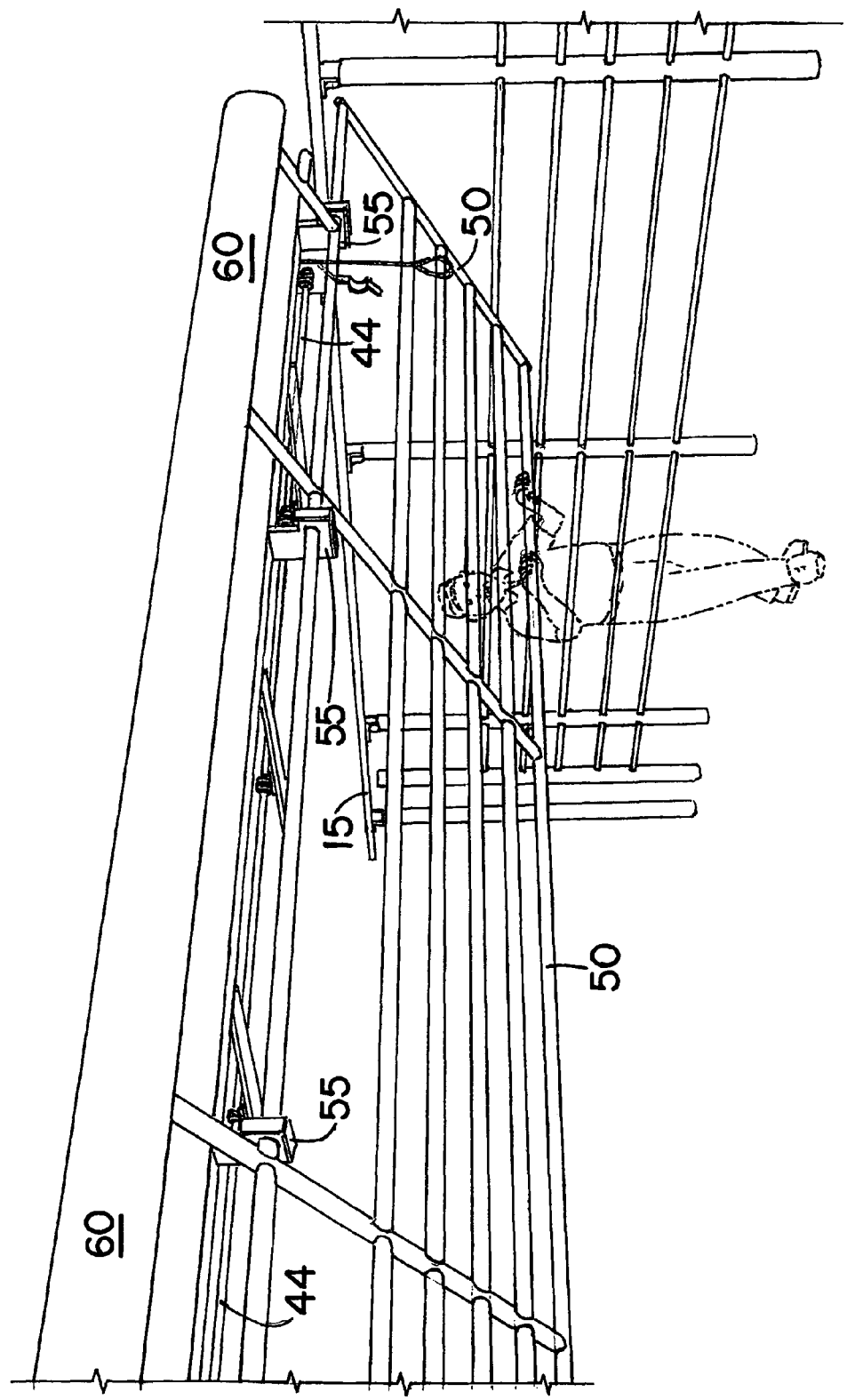
FIG. 6 is another perspective view of the counterweighted, crowd gate device of the present invention being manually pivoted by an individual.
Figure 7:
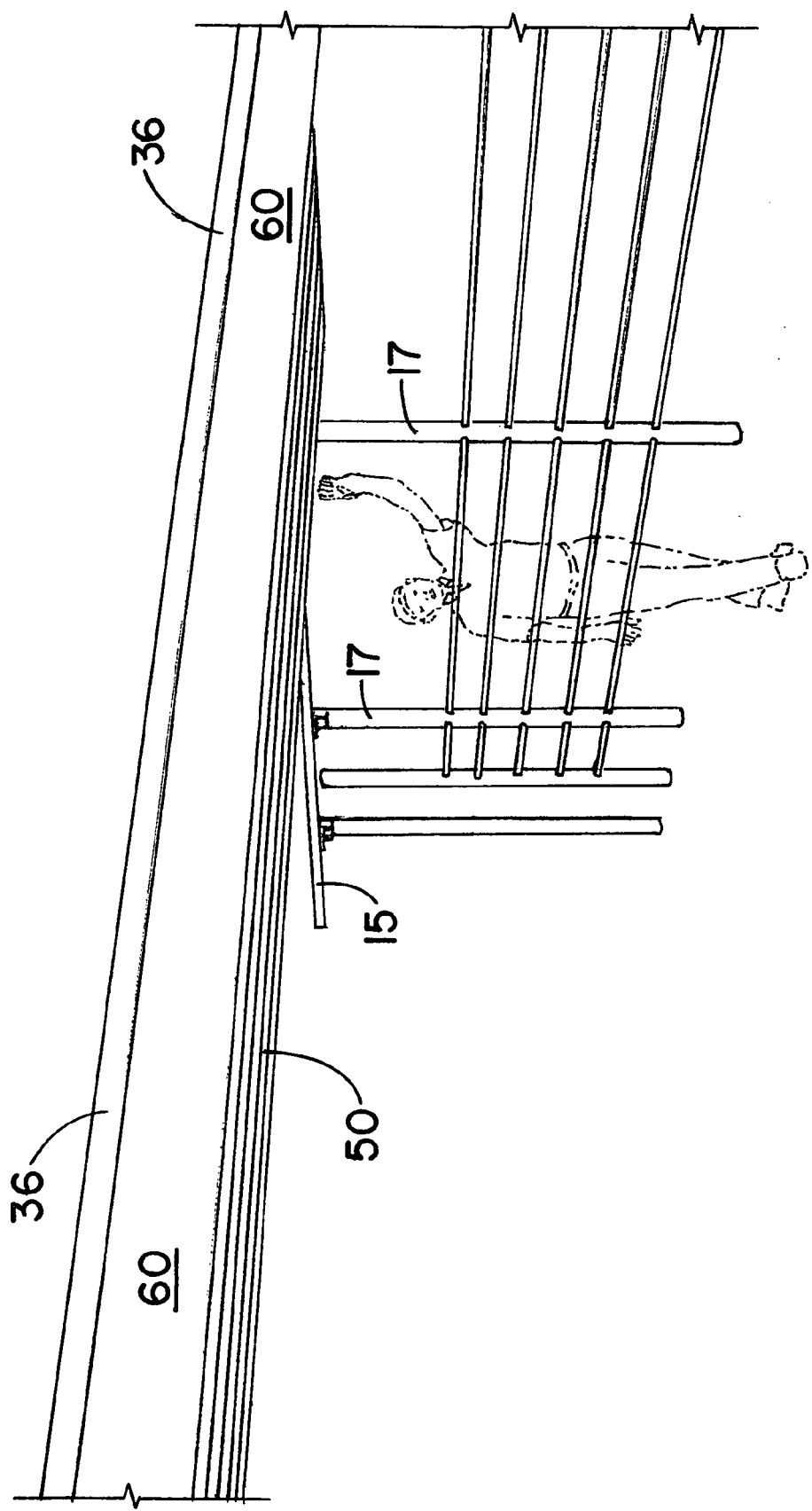
FIG. 7 is another perspective view of the counterweighted, crowd gate device of the present invention manually pivoted to a horizontal orientation.

As illustrated in FIGS. 5-7, an operator trips the gate latch 70 and manually pivots the crowd gate 50 to a substantially horizontal position, so that the crowd gate 50 may pass over an animal on the floor of the holding area on the return of the wheeled carriage assembly 20 to the entrance end of the holding area, as seen in FIG. 8. Manual operation of the gate latch 70 and pivoting of the crowd gate 50 greatly simplifies the mechanical features of the present invention. The crowd gate 50 is pivotally mounted to the wheeled carriage assembly 20 by a plurality of bushings 55 that electrically insulate the crowd gate 50 and attached counterweight 60 from the wheeled carriage assembly 20 that includes the electric motor 40. In addition, the gate latch 70 is electrically insulated from the wheeled carriage assembly 20. If the electric motor 40 mounted on the wheeled carriage assembly 20 shorts out to the wheeled carriage assembly 20, the electrically insulated bushings 55 and gate latch 70 prevent harm to any animal or individual that may come in contact with the crowd gate 20. A control panel 80, FIG. 9, allows for operation of the counterweighted, crowd gate device 10 from a remote location.

While the invention has been particularly shown and described with reference to preferred embodiments thereof, it will be understood by those skilled in the art that various changes in form and details may be made therein without departing from the spirit and scope of the invention.

I claim:

1. A counterweighted, crowd gate device adapted for use in a milking parlor, the counterweighted, crowd gate device comprising:
   parallel overhead tracks extending from an entrance end to an exit end of a holding area of the milking parlor;
   a wheeled carriage assembly extending between and riding on the tracks;
   a motor mounted on the wheeled carriage and activated to drive the wheeled carriage assembly from the entrance end to the exit end of the holding area and return;
   a gate pivotally attached to the wheeled carriage assembly and extending perpendicularly therefrom;
   a counterweight mounted on the gate, above the level of attachment of the gate to the wheeled carriage assembly, the counterweight being essentially equal to the weight of that part of the gate hanging below the level of attachment;
   the gate and attached counterweight pivotally attached to the wheeled carriage assembly by a plurality of electrically insulating bushings to electrically isolate the gate and attached counterweight from the wheeled carriage;
   a gate latching operative to latch and to secure the gate in a vertical position during travel of the wheeled carriage assembly to the exit end of the holding area; and
   a control panel for controlling the motor;
   whereby an operator manually operates the latch and pivots the gate to a substantially horizontal position so that the gate may pass over an animal in the holding area, on the return of the wheeled carriage assembly to the entrance end of the holding area.

2. The counterweighted, crowd gate device adapted for use in a milking parlor of claim 1, wherein the wheeled carriage assembly includes an H-shaped frame with a pair of wheels at each leg end for engaging the parallel overhead tracks.

3. The counterweighted, crowd gate device adapted for use in a milking parlor of claim 2, wherein the overhead tracks are L-shaped angle iron.

4. The counterweighted, crowd gate device adapted for use in a milking parlor of claim 3, wherein the pair of wheels at each leg end of the wheeled carriage frame include a vertically oriented wheel contacting a horizontal portion of the L-shaped angle iron and a horizontally oriented wheel contacting a vertical portion of the L-shaped angle iron.

5. The counterweighted, crowd gate device adapted for use in a milking parlor of claim 1, wherein the motor is an electric motor operatively connected to a single drive shaft spanning the parallel overhead tracks and connected at each end to one vertically oriented wheel.

6. The counterweighted, crowd gate device adapted for use in a milking parlor of claim 1, wherein the gate latch is electrically insulated from the wheeled carriage.

7. The counterweighted, crowd gate device adapted for use in a milking parlor of claim 1, further including a pair of limit switches, each switch positioned at one ends of the wheeled carriage assembly, the switches turning off the motor as the wheeled carriage assembly approaches the entrance end and exit end of the holding area of the milking parlor.

8. A counterweighted, crowd gate device adapted for use in a milking parlor, the counterweighted, crowd gate device comprising:
   parallel, overhead, L-shaped, angle iron tracks extending from an entrance end to an exit end of a holding area of the milking parlor;
   an H-shaped, wheeled carriage assembly extending between and riding on the L-shaped tracks, the H-shaped, wheeled carriage assembly including a pair of wheels at each leg end thereof for engaging the parallel, overhead tracks;
   a motor mounted on the wheeled carriage assembly and activated to drive the wheeled carriage assembly from the entrance end to the exit end of the holding area and return;
   a gate pivotally attached to the wheeled carriage assembly and extending perpendicularly therefrom;
   a counterweight mounted on the gate, above the level of attachment of the gate to the wheeled carriage assembly, the counterweight being essentially equal to the weight of that part of the gate hanging below the level of attachment;
   the gate and attached counterweight pivotally attached to the wheeled carriage assembly by a plurality of electrically insulating bushings to electrically isolate the gate and attached counterweight from the wheeled carriage assembly;
   a gate latch operative to latch and to secure the gate in a vertical position during travel of the wheeled carriage assembly to the exit end of the holding area; and
   a control panel for controlling the motor;
   whereby an operator manually operates the gate latch and pivots the gate to a substantially horizontal position so that the gate may pass over an animal in the holding area, on the return of the wheeled carriage assembly to the entrance end of the holding area.

9. The counterweighted, crowd gate device adapted for use in a milking parlor of claim 8, wherein the pair of wheels at each leg end of the wheeled carriage assembly include a vertically oriented wheel contacting a horizontal portion of the L-shaped angle iron and a horizontally oriented wheel contacting a vertical portion of the L-shaped angle iron.

10. The counterweighted, crowd gate device adapted for use in a milking parlor of claim 8, wherein the motor is an electric motor operatively connected to a single drive shaft spanning the parallel overhead tracks and connected at each end to one vertically oriented wheel.

11. The counterweighted, crowd gate device adapted for use in a milking parlor of claim 8, wherein the gate latch is electrically insulated from the wheeled carriage.

12. The counterweighted, crowd gate device adapted for use in a milking parlor of claim 8, further including a pair of limit switches, each switch positioned at one end of the wheeled carriage assembly, the switches turning off the motor as the wheeled carriage assembly approaches the entrance end and exit end of the holding area of the milking parlor.

13. A counterweighted, crowd gate device adapted for use iii a milking parlor, the counterweighted, crowd gate device comprising:
   parallel, overhead, L-shaped, angle iron tracks extending from an entrance end to an exit end of a holding area of the milking parlor;
   an H-shaped, wheeled carriage assembly extending between and riding on the L-shaped tracks, the H-shaped, wheeled carriage assembly including a pair of wheels at each leg end thereof for engaging the parallel, overhead tracks;
   an electric motor mounted on the wheeled carriage assembly and operatively connected to a single drive shaft spanning the parallel overhead tracks and connected at each end to one vertically oriented wheel, the electric motor activated to drive the wheeled carriage assembly from the entrance end to the exit end of the holding area and return;
   a gate pivotally attached to the wheeled carriage assembly and extending perpendicularly therefrom;
   a counterweight mounted on the gate, above the level of attachment of the gate to the wheeled carriage assembly, the counterweight being essentially equal to the weight of that part of the gate hanging below the level of attachment;
   the gate and attached counterweight pivotally attached to the wheeled carriage assembly by a plurality of electrically insulating bushings to electrically isolate the gate and attached counterweight from the wheeled carriage assembly;
   a gate latch operative to latch and to secure the gate in a vertical position during travel of the wheeled carriage assembly to the exit end of the holding area; and
   a control panel for controlling the motor;
   whereby an operator manually operates the latch and pivots the gate to a substantially horizontal position so that the gate may pass over an animal in the holding area, on the return of the wheeled carriage assembly to the entrance end of the holding area.

14. The counterweighted, crowd gate device adapted for use in a milking parlor of claim 13, wherein the pair of wheels at each leg end of the wheeled carriage assembly include a vertically oriented wheel contacting a horizontal portion of the L-shaped angle iron and a horizontally oriented wheel contacting a vertical portion of the L-shaped angle iron.

15. The counterweighted, crowd gate device adapted for use in a milking parlor of claim 13, wherein the gate latch is electrically insulated from the wheeled carriage.

16. The counterweighted, crowd gate device adapted for use in a milking parlor of claim 13, further including a pair of limit switches, each switch positioned at one ends of the wheeled carriage assembly, the switches turning off the motor as the wheeled carriage assembly approaches the entrance end and exit end of the holding area of the milking parlor.

* * * * *